United States Patent
Connolly et al.

(10) Patent No.: US 8,214,619 B1
(45) Date of Patent: Jul. 3, 2012

(54) MEMORY ALLOCATION IN A MOBILE DEVICE

(75) Inventors: Brian Connolly, Seattle, WA (US); Rupen Chanda, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 521 days.

(21) Appl. No.: 11/945,241

(22) Filed: Nov. 26, 2007

(51) Int. Cl.
G06F 13/00 (2006.01)
G06F 12/02 (2006.01)

(52) U.S. Cl. .............. 711/171; 711/E12.084; 710/56; 718/104; 725/62; 725/84

(58) Field of Classification Search .............. 711/171
See application file for complete search history.

(56) References Cited

U.S. PATENT DOCUMENTS

| | | | |
|---|---|---|---|
| 6,564,003 B2 | 5/2003 | Marko et al. | |
| 6,725,022 B1 * | 4/2004 | Clayton et al. | 455/154.1 |
| 7,088,680 B1 * | 8/2006 | Freitag et al. | 370/236 |
| 7,110,373 B2 * | 9/2006 | Lee | 370/328 |
| 7,395,385 B2 * | 7/2008 | Cobley | 711/158 |
| 7,822,428 B1 * | 10/2010 | Morris et al. | 455/508 |
| 2002/0090934 A1 * | 7/2002 | Mitchelmore | 455/412 |
| 2003/0005019 A1 * | 1/2003 | Pabla et al. | 709/1 |
| 2005/0009538 A1 | 1/2005 | MacKay et al. | |
| 2005/0144152 A1 | 6/2005 | Punaganti et al. | |
| 2005/0188406 A1 * | 8/2005 | Gielow et al. | 725/81 |
| 2005/0286856 A1 * | 12/2005 | Aerts | 386/46 |
| 2006/0107327 A1 | 5/2006 | Sprigg et al. | |
| 2007/0130331 A1 | 6/2007 | Kao et al. | |
| 2007/0198698 A1 | 8/2007 | Boyd et al. | |
| 2007/0199019 A1 | 8/2007 | Angiolillo et al. | |
| 2008/0076573 A1 | 3/2008 | Loehrer | |
| 2008/0104710 A1 | 5/2008 | Jorden et al. | |
| 2008/0243998 A1 | 10/2008 | Oh et al. | |
| 2008/0319734 A1 | 12/2008 | Kim | |

FOREIGN PATENT DOCUMENTS

| WO | WO 2004054171 | 6/2004 |
|---|---|---|

OTHER PUBLICATIONS

Chanda, "Embedded Document within an Application", Pending U.S. Appl. No. 11/567,111, filed Dec. 5, 2006, 24 pages.
Hosmer, et al., "System and Method for Developing Information for a Wireless Information System", Pending U.S. Appl. No. 10/791,299, filed Mar. 1, 2004, 26 pages.
Morris, et al., "Mobile Rich Media Information System", Pending U.S. Appl. No. 10/791,298, filed Mar. 1, 2004, 43 pages.
Qualcomm Incorporated, "Binary Runtime Environment for Wireless", May 8, 2003, 43 pages.
Rodgers, et al. "Bandwidth Management System", Pending U.S. Appl. No. 10/791,311, filed Mar. 1, 2004, 27 pages.
"What is Push Technology?", Whatis.com, retrieved from internet, updated Jul. 31, 2001.
"What is triangulation?", Whatis.com, retrieved from internet, updated Jul. 9, 2001.

* cited by examiner

*Primary Examiner* — Hetul Patel
(74) *Attorney, Agent, or Firm* — Fish & Richardson P.C.

(57) ABSTRACT

Systems and methods, including computer software stored on a machine-readable medium for performing operations, can be implemented for allocating memory. Multiple channels are defined on a mobile device. Each channel can be adapted to receive a predetermined type of content for access on the mobile device. An amount of memory allocated to each channel for storing data is defined. Data identifying a new amount of memory allocated to one of the channels is received, and the amount of memory allocated to the channel is adjusted based on the data identifying the new amount of memory.

18 Claims, 4 Drawing Sheets

MEMORY ALLOCATION IN A MOBILE DEVICE

BACKGROUND

The present disclosure relates to memory allocation in computer systems in general and more specifically relates to memory allocation in mobile information systems. In a mobile information system, subscribers may register with a wireless service provider to receive various types of content from the service provider on their mobile devices. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Many different types of content are provided to mobile devices equipped with such application environments, and the amount of memory required depends on the particular type of content provided.

SUMMARY

This specification describes technologies relating to memory allocation in a mobile device.

In general, one aspect of the subject matter described in this specification can be embodied in a method that includes defining multiple channels on a mobile device. Each channel is adapted to receive a predetermined type of content for access on the mobile device. An amount of memory allocated to each channel for storing data is defined. Data identifying a new amount of memory allocated to one of the channels is received, and the amount of memory allocated to the channel is adjusted based on the data identifying the new amount of memory. Other embodiments of this aspect include corresponding systems, apparatus, and computer program products.

In another general aspect, a system includes one or more databases operable to store content for multiple available channels, and the content includes one or more files for delivery to mobile or remote devices based on a registration of each remote device to receive updates for one or more channels. One or more servers are adapted to automatically deliver content updates to remote devices based on the registration of each remote device to receive updates for one or more channels. The servers are also adapted to send instructions to the remote devices to adjust an amount of memory allocated to one or more channels based on the registration of each remote device. Other embodiments of this aspect include corresponding methods, apparatus, and computer program products.

These and other embodiments can optionally include one or more of the following features. Each channel can include an associated cache of content received from a remote server, where the content can be selectively accessed by a user of the mobile device. The content for each channel can be periodically updated from the remote server. Data identifying a new amount of memory allocated to another of the plurality of channels can be received, and an unavailability of the new amount of memory on the mobile device can be identified. Updates to the channel can be suspended at least until the new amount of memory becomes available. The data identifying the new amount of memory may be received from the remote server. The defined amount of memory allocated to each channel can be defined by data received from the remote server. The amount of memory allocated to the channel can be adjusted by determining that a current amount of stored data for the channel exceeds the new amount of memory, and delaying the adjustment to the amount of memory allocated to the channel at least until the amount of stored data for the channel does not exceed the new amount of memory. The new amount of memory can be determined, at least in part, based on one or more characteristics of the device. Content updates can be received for multiple information channels on a mobile device. The content updates can be stored in a data storage on the mobile device. Content corresponding to one or more content updates for one or more information channels can be presented in response to a user selection on the mobile device. The content can be presented by executing one or more files stored in the data storage using a media player on the mobile device. The data identifying the new amount of memory can be received by the mobile device from a remote server. The content updates can be received from the remote server. The content updates can be requested according to one or more predetermined update schedules. The content updates can be received based on a registration of the mobile device to receive content updates for the multiple information channels, and a frequency of content updates can be determined by the remote server. Each available channel can have an associated amount of memory, and an interface can be used for receiving instructions to update the amount of memory associated with each available channel. Content can be received from one or more remote content providers, and content stored in one or more databases for delivery to mobile devices can be updated based on the content received from the one or more remote content providers. The content updates can be automatically delivered to each mobile device based on at least one of a predetermined interval, an expiration of content previously delivered to the mobile device, or a message from the mobile device that content previously delivered to the mobile device can be replaced. The one or more servers can be further adapted to determine, for each mobile device, whether the amount of memory allocated to one or more channels needs to be updated on the mobile device.

Particular embodiments of the subject matter described in this specification can be implemented to realize one or more of the following advantages. Memory allocated to store different types of content on a mobile device may be changed automatically from a remote server. Controlling memory allocations remotely may enhance the user experience and allow a centralized and/or automated process to ensure sufficient memory resources are available on the mobile device to handle content that is automatically sent to the device (i.e., pushed or pulled) based on a registration to receive particular types of content (e.g., information channels). Feedback from the device regarding availability of memory may help avoid errors caused by insufficient memory resources and/or allow a central server to identify potential issues with respect to memory allocations. Memory allocations may be made based on changes in the volume or resource demands of content over time. Memory allocations may be adjusted over time to provide more efficient uses of limited storage space on mobile devices.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

When a computer system, such as a mobile information system, is configured to provide content to a user device, such as a mobile device, the computer system may implement memory allocation procedures to determine the storage of content in the memory of the user device. In a mobile information system, subscribers may register with a wireless service provider to receive various types of content from the service provider on their mobile devices. Third party content providers may also register or contract with the wireless service provider to provide various types of content to subscribers over a network, such as the Internet, via the service provider. The subscriber's mobile device may include a resident interactive multimedia application environment that includes capabilities for displaying graphics, video, animation, audio, and the like. Examples of such interactive multimedia application environments are the different versions of the Adobe® Flash®-based platform. Content provided to mobile devices equipped with such application environments are sometimes delivered in executable file formats such as the precisely described SWF (small web format) binary vector graphics format. SWF provides a compact, TAG-based, easily extendible format that supports streaming, bitmap and vector graphics, and scripting. Content may include other data or files, such as a feature film, an executable software update, or a software extension.

In some implementations, wireless service providers deliver content to the mobile devices of their subscribers in the form of information channels. Each information channel may originate with the wireless service provider or may originate with third party content providers. When a subscriber subscribes to a particular information channel, the wireless service provider delivers content associated with that information channel to the subscriber's mobile device. The content may be delivered as a channel feed to a file system (i.e., a feed store) located on the mobile device. The feed store may be logically divided into separate compartments or memory allocations with each channel assigned its own compartment on a static or dynamic basis. Periodically, the wireless service provider may deliver channel content updates to the mobile device. The updates may be provided according to a predetermined schedule, in response to a request from the mobile device, in response to an availability of updates at the content provider, in response to an expiration or consumption (e.g., viewing) of content previously delivered to the mobile device or in some other way. Because the channel content is stored locally on the mobile device and frequently updated, the subscriber is usually able to access the channel without having to wait for channel content or content updates to be delivered over the network. The channel content may be automatically delivered to the mobile device in the background (i.e., without a specific user request and/or while the mobile device is otherwise idle or being used to view other channels or perform other operations).

For example, a wireless service provider may offer several different information channels to its subscribers. Some information channels may be freely available to all subscribers, while other information channels may require premium subscriber status. The content of some information channels may originate with the wireless service provider. The content of other information channels may originate with third parties that have registered with the service provider. The content of still other information channels may originate with other sources. The offered information channels may include a premium news channel. If a subscriber has subscribed to the premium news channel, then the wireless service provider may establish a channel feed to periodically or sporadically deliver content from the premium news channel to the feed store located on the subscriber's mobile device. When the subscriber accesses the premium news channel, processes on the mobile device retrieve the content from the feed store. Even if the subscriber rarely or even never accesses the premium news channel, the channel feed may provide for regular updates of channel content in the feed store based, for example, on an expiration of content and/or an availability of new content.

Channel content may be in the form of text, images, vector graphics, bitmaps, frame-based animation, video, or in any other format supported by the mobile information system, and may include executable scripts or other sequences of instructions. Depending on the format of the channel content, an application running on the mobile device, such as a media player or other type of media player component, may be invoked to run the script, execute the instructions, or otherwise display the content. One example of such a mobile information system is described in U.S. patent application Ser. No. 10/791,298, filed Mar. 1, 2004 and entitled "MOBILE RICH MEDIA INFORMATION SYSTEMS," the entire contents of which are hereby incorporated by reference.

Different channels may require different amounts of memory in the mobile device due to the different formats and types of channel content. For example, a weather channel may require multiple megabytes (e.g. 10 MB) of memory in order to store satellite images and weather-related graphics, and a stock ticker channel may only require several kilobytes (e.g. 256 kB) of memory in order to store text data related to stock prices. In order to allow seamless integration of content updates into the memory of the mobile device, a channel may have a pre-determined amount of memory allocated in the mobile device. The amount of memory required by a channel may be determined or recommended by the content provider of that channel, and a system administrator may accept or change the content providers' recommendation. The amount of memory required by a given channel may change, for example, if the content provider wants to include more or less content in the given channel. In this case, the service provider or the system administrator may send data to the mobile device instructing the mobile device to allocate a new amount of memory to the given channel.

Figure 1:
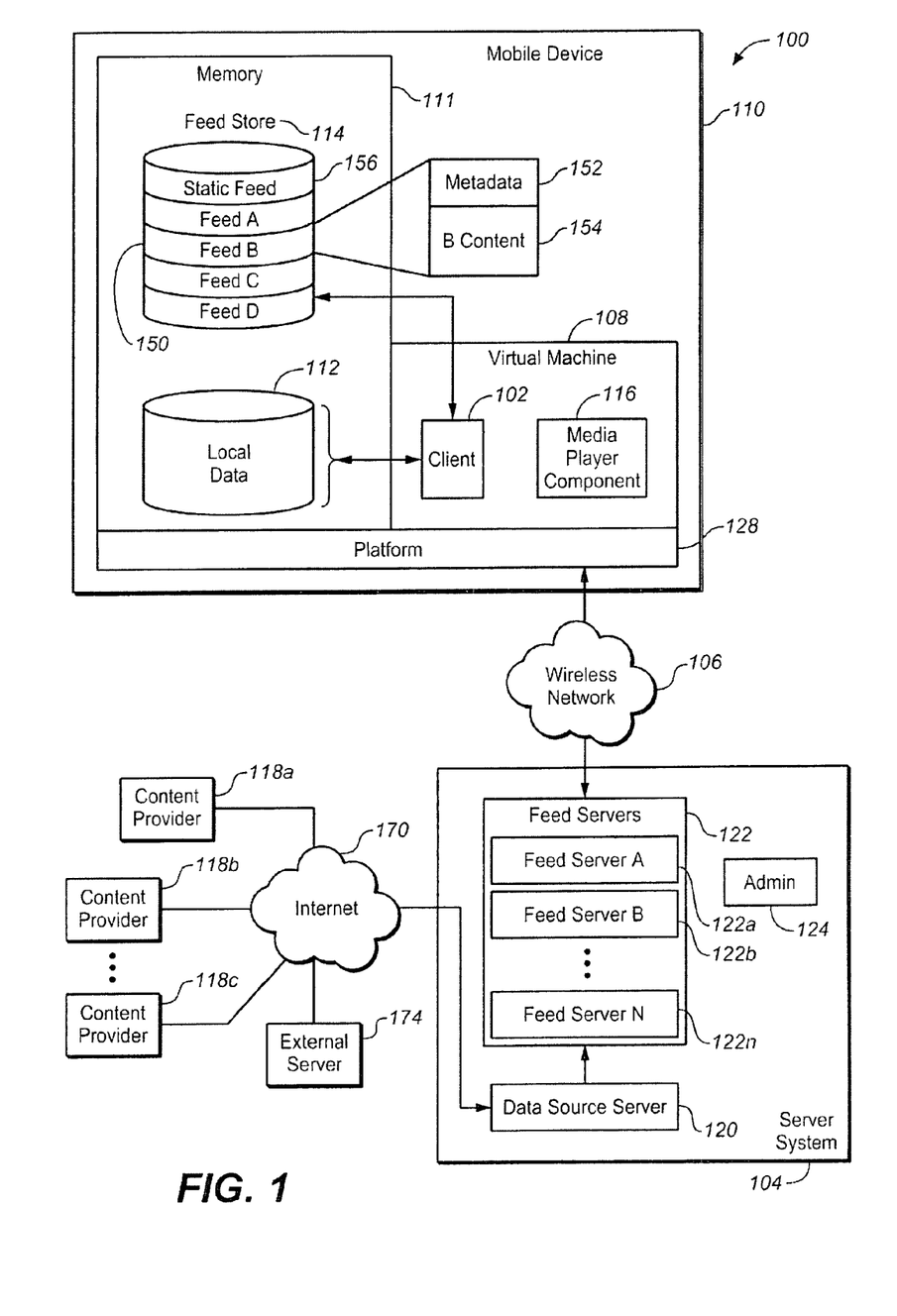
FIG. 1 is an illustration of an example mobile information system in accordance with some aspects of the present disclosure.

FIG. 1 illustrates an example system 100 for providing system security by associating permissions with content. System 100 represents a mobile information system for delivering mobile data services to mobile device 110. The mobile information system represented in system 100 is administered by a wireless service provider, such as T-Mobile®, Verizon Wireless®, or Sprint Nextel®, that operates wireless network 106. Subscribers to the wireless service may receive external content from content providers 118 through mobile device 110. In some implementations, mobile device 110 is a mobile phone. In other implementations, mobile device 110 is a personal data assistant, a laptop computer, or any other device suitable to receive content over wireless network 106. Mobile device 110 includes memory 111 that may be accessed by the various components of the mobile device 110. The memory 111 is configured to store information including local data 112 and feed store 114. Local data 112 may include a call log, contacts, and favorites, as well as various other types of local data (e.g., settings and preferences, calendar appointments and reminders, task lists, and the like). A call log may represent calls recently initiated or received by mobile device 110. Contacts may represent a subscriber's associates and may include names, home and business addresses, phone numbers, email addresses, and other information related to the subscriber's associates. Favorites may represent the phone numbers associated with the subscriber's calling plan. Call log, contacts, and favorites represent examples of data that may be stored as local data 112 on mobile device 110. Individual implementations may include none, some, or all of these examples, in addition to other types of local data not discussed.

The mobile device 110 is also configured to store channel content in feed store 114. Feed store 114 may include multiple channel feeds, where a feed may be static or dynamic. Illustrated feed store 114 includes static feed 156 and multiple dynamic feeds (feed A, feed B, feed C, and feed D). The feed store memory allocation may be determined, at least partially and in some implementations fully, by the server system 104 or by content providers 118. For example, a content provider 118a may provide two news channels. One of the news channels, News Lite, may provide news content primarily in a text format and may thus require a relatively small amount of memory (e.g. 256 kB). The other news channel, News Big, may provide news content using both text and images and may thus require a larger amount of memory (e.g. 10 MB). The content provider 118a may then recommend that 256 kB be allocated to News Lite and 10 MB be allocated to News Big. The administrator 124 may accept the recommendation of content provider 118a. Subsequently, when a mobile device 110 subscribes to one of the two news channels, the server system 104 may instruct the mobile device 110 to allocate the appropriate amount of memory. By allocating memory as instructed, the mobile device 110 may help ensure that it has sufficient memory available for future channel feed updates, given that the content providers 118 and/or service provider 104 should enforce rules preventing content from exceeding the established memory requirements. One advantage of this approach is that a user can decide whether to allocate, for example, 256 kB or 10 MB of memory to news depending, for example, on available memory, desired feature quality, and/or tradeoffs with other channels. Another advantage of this approach is that content may be automatically updated without having to reallocate memory in the mobile device 110. For example, mobile device 110 may store content updates for feed A without deleting content from feed B, C, or D, since the memory for feed A content is already allocated.

In some situations, the amount of memory in a mobile device allocated to a channel feed may need to be increased or decreased. For example, a channel feed dedicated to baseball news may only require a small amount of memory during winter months, since there may be less baseball news to report during the winter, and the same channel feed dedicated to baseball news may require a larger amount of memory during the spring, summer and fall months of baseball season. As a specific example, content provider 118b may provide a channel College Baseball. During the winter, a relatively small amount of memory (e.g. 256 kB) may be allocated to College Baseball, and when baseball season begins in the spring, content provider 118b may recommend that a larger amount of memory (e.g. 3 MB) be allocated to College Baseball, since there is more content to provide. The administrator 124 may accept the change recommendation of content provider 118b. The amount of memory allocated in feed store 114 of mobile devices 110 that subscribe to the channel College Baseball may then be adjusted accordingly.

The adjustment of memory allocation may be implemented using a variety of techniques. In some implementations, the amount of memory required for a channel feed may be identified in each update of the channel feed, for example in metadata included with the channel feed update. In this type of implementation, the mobile device 110 may recognize that the amount of data required for a given channel has changed based on the metadata, and the mobile device 110 may then allocate the appropriate amount of memory. In other implementations, the administrator 124 or the server system 104 may determine that the memory requirements for a certain channel have changed since the last update of the certain channel on a particular mobile device 110. In this type of implementation, the server system 104 may send, over wireless network 106, instructions to adjust the amount of memory allocated to the certain channel in the particular mobile device 110. The system 100 may use either of these techniques, a combination of the two techniques or other techniques for adjusting memory allocation in the mobile device 110. One advantage of the techniques discussed here is that allocation of memory 111 may be (from the user's perspective) automatically adjusted to accommodate changes in content.

Of course, the memory requirements for an adjustment of memory allocation may not always be available. For example, an adjustment of memory allocation may require that a certain channel be allocated a new amount of memory that is less than the current amount of stored data for the certain channel. As a specific example, feed A may include 1 MB of data, and an adjustment of memory allocation may require 512 kB of memory for feed A. In this situation, the adjustment of memory allocation may be delayed at least until the amount of data stored in feed A is not greater than 512 kB, or the adjustment of memory allocation may require content to be deleted from the channel feed being adjusted. Alternatively, an adjustment of memory allocation may require that a channel be allocated an amount of memory that is currently unavailable in memory 111. As a specific example, memory 111 may include 3 MB of unallocated memory, and an adjustment of memory allocation may require that a given channel be allocated an additional 4 MB of memory. In this situation, updates to the channel content may be suspended until 4 MB of memory are available, or the adjustment of memory allocation may require at least 1 MB of memory be "deallocated" in memory 111, for example, from a different channel. There are other cases where an adjustment of memory allocation may not be available. The system 110 may provide error-handling mechanisms and processes for responding to such situations. In some implementations, when memory requirements for an adjustment of memory allocation are not available, the mobile device 110 may send an error message to the server 104, content updates for one or more channels may be suspended and/or adjustments to memory allocation may be delayed until the memory requirements are available.

At a high level, server system 104 may receive information from content providers 118, organize the retrieved information along with some or all of any associated memory allocations into individual information channel feeds, and deliver the information channel feeds to client 102. Client 102 may then store the information channel feeds in feed store 114. In addition to the dynamic channel feeds received from server system 104, feed store 114 may also contain one or more static feeds 156. Static feed content and associated permissions may be preloaded on mobile device 110 instead of delivered by server system 104. In addition to providing information, channel feeds may also be used to provide services, such as a home page user interface, calendar user interface and services, or other user interfaces or specialized application services. From a security standpoint, there may be little or no difference between static feeds and dynamic feeds or between information channels and service channels.

When a subscriber attempts to access a particular information channel, for example, channel B 150, client 102 may retrieve channel B content 154 and channel B metadata 152 from feed store 114. Depending on the format of channel B content 154, client 102 may provide channel B content 154 to media player component 116. In some implementations, channel B content 154 is a SWF file and media player component 116 is an Adobe® Flash®-based media player component that provides media player functionality. Client 102 and media player component 116 may form two parts of a single virtual machine 108 running on mobile device 110. The virtual machine 108 may run on a device platform 128. Client 102 and media player component 116 may then be programmed to run on the virtual machine.

In some implementations, the functionality of media player component 116 may be extended. Such an extension may be used to expand the functionality of media player component 116, such as by providing support for additional commands or services. For example, a service provider may wish to provide channel content that displays or otherwise accesses or manipulates data from local data 112 such as a call log. The service provider may develop a custom command or instruction that can be provided in the channel feed and stored in feed store 114. Such a command may be unrecognized by unextended media player component 116 and client 102. The service provider may then install a custom extension on mobile device 110 that recognizes and performs the custom command or instruction, effectively increasing the number of commands or instructions recognized by media player component 116. The extension may be implemented through an application programming interface (API) supported by the client 102, which defines certain types of messages that can be passed between the client 102 and the extension. In another example, a third party content provider may develop a custom command or instruction to perform some other activity. An extension may be a software module that is distributed preinstalled on mobile device 110 or downloaded to mobile device 110, for example over wireless network 106.

Client 102 provides a framework for displaying and managing content received on mobile device 110, including content received from server system 104. Client 102 may be responsible for the caching of received content, for communication with server system 104, and for various other tasks. Client 102 may manage subscriber input and memory devices 112 and 114. In addition, client 102 may manage security features that protect the privacy of subscribers and content and prevent unauthorized parties from interfering with the service. In some implementations, client 102 is distributed preinstalled on mobile device 110, while in other implementations, client 102 or an update to client 102 is downloaded to mobile device 110, for example over wireless network 106.

Client 102 may access media player component 116 to render a user interface and content and to perform scripting operations. In some implementations, media player component 116 is a media player that supports vector graphics, bitmaps, and frame-based animation, as well as text input and dynamic text. Media player component 116 may be able to process files, such as SWF files, in which content providers 118 use native device fonts or embed arbitrary fonts. Media player component 116 may also support scripting integration with mobile device 110 capabilities, including keypad navigation, button presses, notification, messaging, and media playback, as well as integration with general mobile device 110 operating system functionality. This enables client 102 to be integrated with other mobile device 110 applications and functionalities. Scripting may be accomplished with ActionScript™ or any other suitable scripting language supported by media player component 116.

Client 102 may be configured to interact with mobile device 110's underlying features and applications through a set of scriptable commands. In some implementations, client 102 may interact with native functions of the mobile device 110 by interfacing with a platform 128 of the mobile device 110. Such commands may enable channel content to retrieve and set subscriber preferences, provide time and date information from the host environment, or launch external applications such as a browser or media player. In some implementations, upon launching an external application, the subscriber is instantly transferred to that application. Client 102 may maintain the state of the user interface so that the subscriber can return to the same screen of client 102 from which the external application was launched, creating a perception of an integrated experience.

Mobile device 110 may have a fully customizable user interface design, through feed store 114, that consists of individual Flash® elements (i.e., SWF files) independent of client 102's core functionality. In some implementations, the SWF files enable subscribers to use mobile device 110's soft keys to control navigation and client 102's meta functions such as setting preferences. Feed store 114 may be updated over wireless network 106 and may use an asynchronous communication protocol that updates all content through a background delivery mechanism that is transparent to subscribers. This enables subscribers to continue browsing one information channel, for example, channel B 150, while a different information channel is updated in the background. Subscribers can also change their preferences when offline; the transaction-based client-server protocol may ensure that such requests will be fulfilled the next time client 102 connects to server system 104. Communications between client 102 and server system 104 may be facilitated through libraries native to platform 128. Platform 128 represents the device-dependent operating system running on mobile device 110. Example implementations of platform 128 are BREW® OS, Symbian OS™, BlackBerry® OS, Windows Mobile® OS, Palm OS®, Linux, Windows XP®, Mac OS®, and the like.

When running in background mode, client 102 may minimize battery usage while periodically receiving updates from server system 104. In some implementations, subscribers can choose between a number of battery-conserving update options, for example, always update, update only when battery strength is above a certain level, and never update. If supported by platform 128, different applications may be running simultaneously. In such cases, client 102 may minimize its use of memory resources when other applications are active. For example, client 102 may have a hibernate mode in which it consumes only a fraction of its normal operating memory. Client 102 may also be configured to limit the number of information channels to which a subscriber may subscribe. When this limit is reached, client 102 may require a subscriber to remove an information channel before a new information channel may be added. Client 102 may also support Short Message Service (SMS) signaling, allowing server system 104 to awaken client 102 and initiate an immediate content update in the case of important events such as breaking news or an immediate retraction of inappropriate content.

Server system 104 may include clusters of feed servers 122 and data source servers 120, as well as report server 126. Report server 126 may allow service providers to monitor server activities and network traffic and may be integrated with other enterprise reporting solutions. The client-server architecture of system 100 may use clustering technology to help ensure performance, reliability, and scalability while minimizing deployment complexities through a flexible integration framework. Server system 104 may aggregate content from external content providers 118 received over the Internet 170 and organize the content into channel content feeds. Server system 104 may filter content feeds based on user preferences, mobile device 110 types, and access controls. Server system 104 may deliver the content feeds to client 102 over wireless network 106. Data source servers 120 may retrieve, normalize, and aggregate content from the web servers of content providers 118, may transform various formats of retrieved content, for example, into a common XML format, and may pass the content on to feed servers 122 for delivery to client 102. Retrievals may be scheduled at predetermined intervals, at which times only differential updates may be collected. Data source servers 120 may be configured to handle content feeds in various formats (e.g., RSS, Atom, XML, etc.). Content feeds may support embedded content types including, for example, text, images, and SWF files.

Using system 100, service providers may be able to provide targeted data service offerings to subscribers. Service providers may be able to promote specific content bundles to certain segments such as business people, teens, casual users, and others. Service providers may be able to make specific content bundles available to all subscribers in, for example, a channel guide, allowing subscribers to select specific content bundles. To increase network efficiency, server system 104 may operate in an occasionally connected data model and may use a communication protocol that enables differential updates, minimizing unnecessary exchanges of data between server system 104 and client 102. For example, in the case of a weather channel, only an update to the temperature may be required, while all other content, such as images, video, or forecasts, remains the same.

Server system 104 may be equipped with an administrator 124 providing the functionality required to manage the servers, including channel administration, subscriber administration, and system management. Using administrator 124, service providers can check, for example, the amount of network traffic each channel generates, deactivate poorly performing channels, and dynamically provision, modify, or remove channels, among other tasks. As part of channel administration, service providers may recommend to administrator 124 the amount of memory to allocate to a channel. Administrator 124 may accept or modify the content provider's recommended memory allocation. Administrator 124 may be implemented as automated processes and may also provide an interface for non-automated (i.e. human initiated or controlled) processes. To the extent administrator 124 is implemented as one or more partially or fully automated processes, administrator may be incorporated into the server 104. In some implementations, administrator 124 may determine, for each mobile device, whether the amount of memory allocated to one or more channels needs to be updated on the mobile device. For example, the administrator 124 may identify that the memory allocated to a certain channel has changed since a particular mobile device's last update. In this case, the administrator may send to the particular mobile device data identifying the new amount of memory allocated to the certain channel.

When client 102 receives a content update from server system 104 via the channel feed, client 102 stores both the channel content and the metadata associated with the content in feed store 114. For example, when client 102 receives a content update for Channel B, client 102 updates Channel B feed 150 in feed store 114. Both Channel B content 154 and the associated Channel B metadata 152 are stored. Channel B feed 150 may be updated multiple times before a subscriber ever accesses it. When a subscriber accesses Channel B through the mobile device 110 user interface, client 102 may retrieve Channel B content 154 (e.g., a SWF file) and Channel B metadata 152 and provide both to media player component 116 (e.g., a media player).

Figure 2:
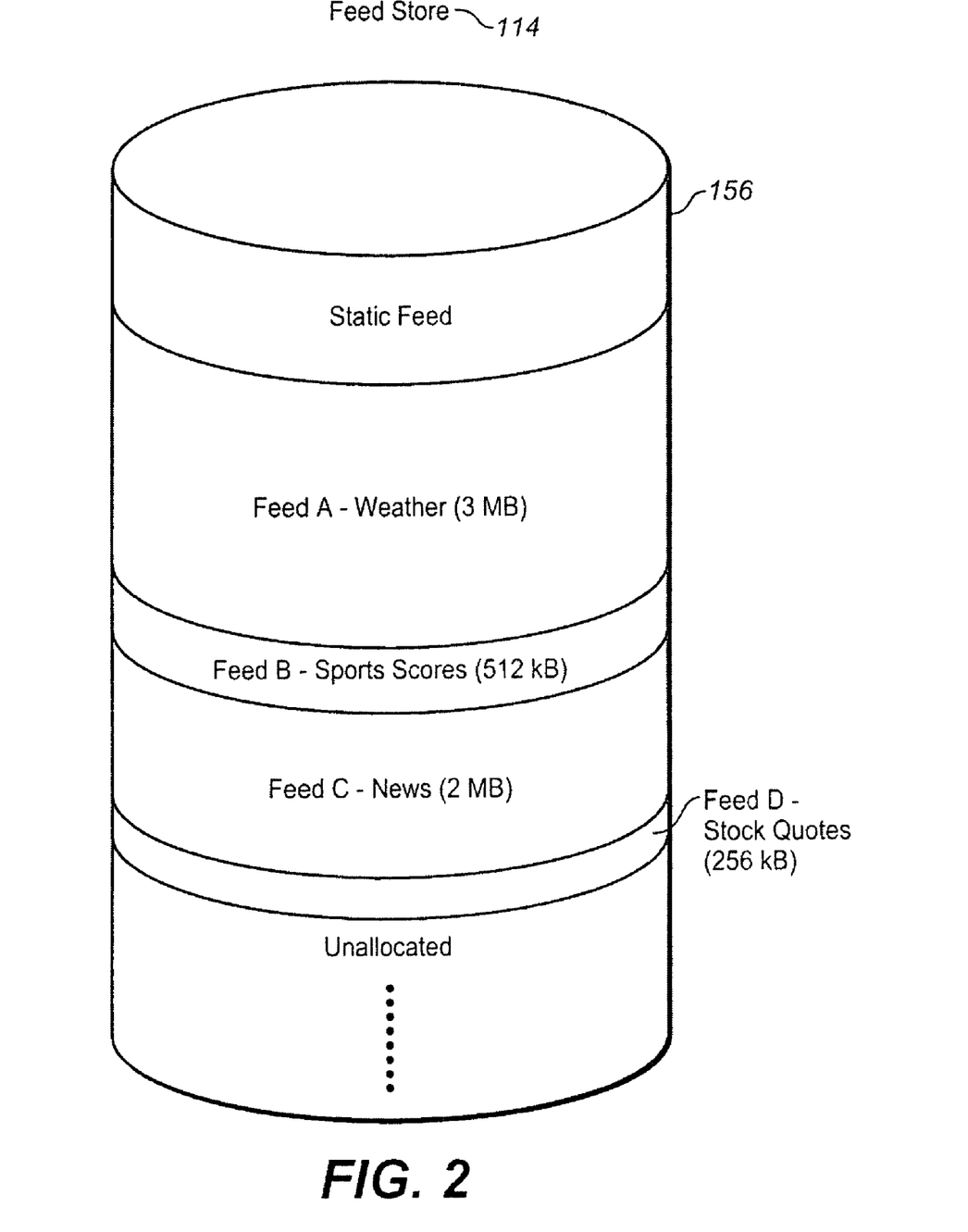
FIG. 2 is an illustration of an example feed store in accordance with some aspects of the present disclosure.

FIG. 2 is an illustration of an example feed store 114, of FIG. 1, in accordance with some aspects of the present disclosure. The illustrated example feed store 114 includes static feed 156, multiple dynamic feeds, in addition to unallocated memory. Due to the different types of content included in each channel feed, different amounts of memory are allocated to each channel. Channels with content such as images and video may require more memory than channels with only text content. Feed A includes 3 MB of memory allocated to the channel Weather. Content for the channel Weather may include, for example, text and image data, such as weather forecasts, satellite images of weather systems and current weather conditions. Feed B includes 512 kB of memory allocated to the channel Sports Scores. Content for the channel Sports Scores may include, for example, text data, such as scores from a variety of sports or sports teams. Feed C includes 2 MB of memory allocated to the channel News. Content for the channel News may include, for example, text, image, and video data, such as news articles as well as any associated images and videos. Feed D includes 256 kB of memory allocated to the channel Stock Quotes. Content for the channel Stock Quotes may include, for example text data, such as the current trading prices of a group of stocks. Feed store 114 includes an amount of unallocated memory. Although the amount of unallocated memory is unspecified in the illustrated example, the amount of unallocated memory may be a defined quantity such as 30 MB. In some cases, feed store 114 may be fully allocated, such that there is no unallocated memory in feed store 114. Data stored in the feed store 114 for each channel may be segregated into multiple blocks, with each block used to stored multiple records. When content updates are received, some of the records in the data blocks may be replaced, others may be deleted (or marked as "old" and thereafter ignored), and new records may be added. The use of multiple data blocks makes data access more convenient.

When mobile device 110 receives an indication that the memory requirement for one or more channels has changed since the last update, the allocation of memory in feed store 114 may be adjusted. For example, if the channel Stock Quotes requires 1 MB of memory, mobile device 110 may identify that the memory allocated to feed D needs to be adjusted. In such a case, some of the unallocated memory of feed store 114 may be allocated to feed D. Alternatively, if the channel Stock Quotes requires only 128 kB of memory, the mobile device may deallocate half (i.e. 128 kB) of feed D. In this case, the amount of unallocated memory may increase by 128 kB. FIG. 2 is not meant to convey the breadth of content and services that may be provided using feed store 114. Indeed, a wide variety of content and services that are not illustrated may be provided. Rather, FIG. 2 illustrates an example allocation of memory for channel feeds in the mobile device 110, in accordance with some implementations of the present disclosure.

Figure 3:
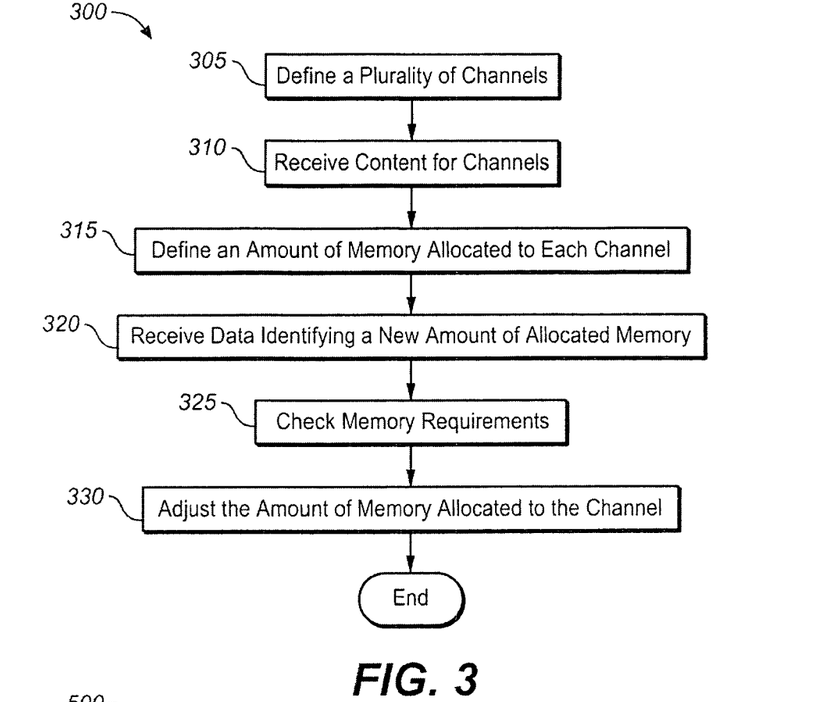
FIG. 3 is a flow chart illustrating an example method of allocating memory in accordance with some aspects of the present disclosure.

FIG. 3 is a flow chart illustrating an example process 300 of allocating memory in a mobile device in accordance with some aspects of the present disclosure. Generally, method 300 describes a process by which an allocation of memory in a mobile device may be adjusted. More specifically, process 300 describes a method by which the memory allocated to one or more channel feeds included in a feed store on the mobile device may be adjusted. For example, process 300 may be implemented in the system 100 of FIG. 1 to achieve some of the previously described functionality.

At 305, a plurality of channels are defined. Available channels may be offered by a wireless service provider or by a third party service provider, and a user of the mobile device may subscribe or register to receive updates to particular channels. Each channel may be adapted to receive a predetermined type of content, such that the content may be delivered to the mobile device for a user to selectively access or view the content. For example, the mobile device may register for the channels News and Baseball Scores at 305. Next, at 310, content for the channels is received. For example, content may be received by the mobile device over wireless network 106. The content may include media or multimedia data. Additionally, the content may include data defining user interfaces, menus, channel features, and the like. Channel content may be in a variety of formats such as text, images, vector graphics, bitmaps, frame-based animation, video, or in any other format. Channel content may further include executable scripts or other sequences of instructions. The channel content may be read by a media player component and displayed or otherwise presented on the mobile device. As a specific example, the channel Baseball Scores may receive text data identifying all of the Major League Baseball scores for a certain day. Furthermore, in some implementations, each channel may include an associated cache of content received from a remote server, and the content may allow selective access by a user of the mobile device. In addition, the content for each channel may be periodically updated by a remote server, for example, in accordance with a predetermined update schedule. The updates may be based on an expiration or a viewing of content, or the updates may be initiated when new content becomes available. In some implementations, the updates may be initiated automatically by the server, while, in other implementations, the mobile device may automatically send a request for updates at an interval or time previously instructed by the server.

At 315, an amount of memory allocated to each channel is defined. The amount of memory allocated to a channel may be allocated in a mobile device for storing content originated by the channel content provider. A content provider may recommend a certain amount of memory to allocate for a given channel, and a system administrator may accept the recommendation. Alternatively, the system administrator may otherwise define the amount of memory allocated to a channel. The amount of memory allocated to a given channel may depend on the type of content typically included in the channel. For example, the channel News may be allocated 2 MB of memory, and the channel Baseball Scores may be allocated 128 kB of memory. The channel News may require more memory than the channel Baseball Scores if images are typically included in the channel News but only text data are typically included in the channel Baseball Scores. The amount of memory allocated to a channel may be defined by data communicated from a server to a mobile device.

Next, at 320, data identifying a new amount of allocated memory is received. In some implementations, the new amount of memory may be determined, at least in part, based on the channel content or on one or more characteristics of the device, which may be known by the server based on profile data stored at the server. For example, the new amount of allocated memory may be determined based on available memory or size of local storage, capabilities of a device such as the ability to play audio or video, the screen size or screen resolution of a device, or others. The new amount of memory allocated may be determined by an administrator or by a content provider based on content changes or other considerations. The data identifying the a new amount of allocated memory may be included as metadata in a channel content update. For example, a mobile device may receive periodic updates for one or more channels, and each update may include the channel memory requirements in the update metadata. If the channel memory requirements included in the metadata are different than the current memory allocation for the channel, the mobile device may identify the channel memory requirements included in the metadata as a new amount of allocated memory. As a specific example, data may be received identifying that the channel News is now allocated 5 MB of memory rather than the previous 2 MB.

At 325, memory requirements are checked. For example, the mobile device may be checked for available memory to increase the memory allocated to one or more channels. If the new amount of memory is unavailable, updates may be suspended at least until the new amount of memory becomes available. As another example, the mobile device may be checked to determine if content would be deleted by decreasing the memory allocated to one or more channels. If the current amount of stored data exceeds the new amount of memory, adjusting the amount of memory allocated to the channel may be delayed at least until the amount of stored data for the channel does not exceed the new amount of memory. In case of either unavailable memory or excess data for the new amount of memory, an error message may be sent to the server, so that the server can suspend updates, log the error for research purposes, identify potential problems with the new amounts of allocated memory, or perform other functions. Continuing the specific example from 320, the mobile device may be checked for 3 MB of additional memory to be allocated to the channel News. A description of an example method for checking memory requirements is discussed below in connection with FIG. 4.

At 330, the amount of memory allocated to the channel is adjusted. Continuing with the specific example from step 320, if the 3 MB of additional memory are available, the channel News may be allocated 5 MB of memory on the mobile device. In some implementations, the amount of memory allocated may be adjusted after a delay initiated during memory requirement checks or after sufficient memory has become available.

Figure 4:
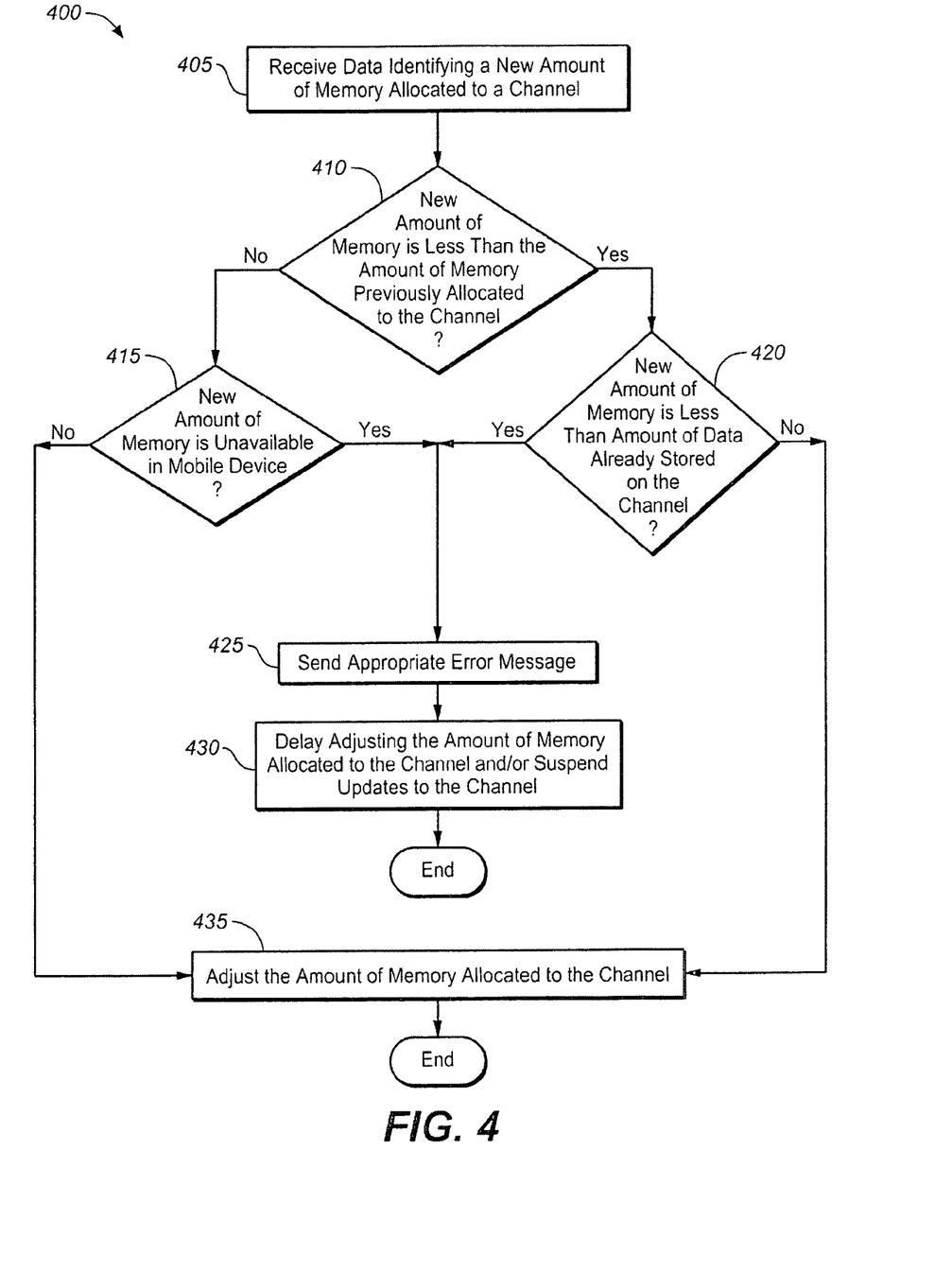
FIG. 4 is a flow chart illustrating an example method of checking memory requirements for memory allocation in a mobile device in accordance with some aspects of the present disclosure.

FIG. 4 is a flow chart illustrating an example process 400 of checking memory requirements for memory allocation in a mobile device in accordance with some aspects of the present disclosure. The process 400 may generally be used to determine whether the memory requirements of an adjustment to memory allocation are available. More specifically, process 400 involves determining the availability of memory requirements for adjusting the memory allocated to one or more channel feeds included in a feed store on a mobile device. For example, process 400 may be implemented in the system 100 of FIG. 1 to achieve some of the previously described functionality.

At 405, data identifying a new amount of memory allocated to a channel is received. For example, the data may be received over wireless network 106. Next, at 410, a determination is made as to whether the new amount of memory is greater than or equal to the amount of memory previously allocated to the channel. If so, a determination is made as to whether the new amount of memory is available in the mobile device at 415. If so, the amount of memory allocated to the channel is adjusted at 435. However, if at 415, it is determined that the new amount of memory is unavailable in the mobile device, an appropriate error message is sent at 425. For example, the error message may be sent to the system server over the wireless network 106 and may identify that that new amount of memory is unavailable in the mobile device. Then at 430, adjusting the amount of memory allocated to the channel is delayed and/or updates to the channel are suspended. These actions may be implemented concurrently or alternatively, as appropriate. For example, the mobile device may suspend storing updates received from the server, or the server may suspend sending updates to the mobile device. If, at 410, it is determined that the new amount of memory is less than the amount of memory previously allocated to the channel, a determination is made at 420 as to whether the new amount of memory is less than the amount of data already stored on the channel. The process 400 proceeds to 425. Alternatively, if the new amount of memory is greater than or equal to the amount of data already stored on the channel, process 400 proceeds to 435 (described above).

Process 400 describes one example method of checking memory requirements for an adjustment of memory allocation. Other methods, which may include some, all, and/or additional operation may also be used. For example, an answer of 'yes' at 415 and 420 may, in some implementations, lead to different subsequent operation. In some implementations, after it is determined at 420 that the new amount of memory is less than the amount of data already stored on the channel, some of the channel content may be deleted, the user may be asked to delete some of the channel content, and/or adjusting the amount of memory allocated to the channel may be delayed until the amount of stored data is less than the new amount of memory. As another example, if it is determined at question 415 that the new amount of memory is unavailable in the mobile device, the user may be notified and asked if there are channels that the user would like to unsubscribe in order to deallocate memory, the user may be given an option to subscribe to a different channel with similar content and less memory requirement (e.g. "News Lite" vs. "News Big"), and/or updates may be suspended until the new amount of memory is available in the mobile device.

Figure 5:
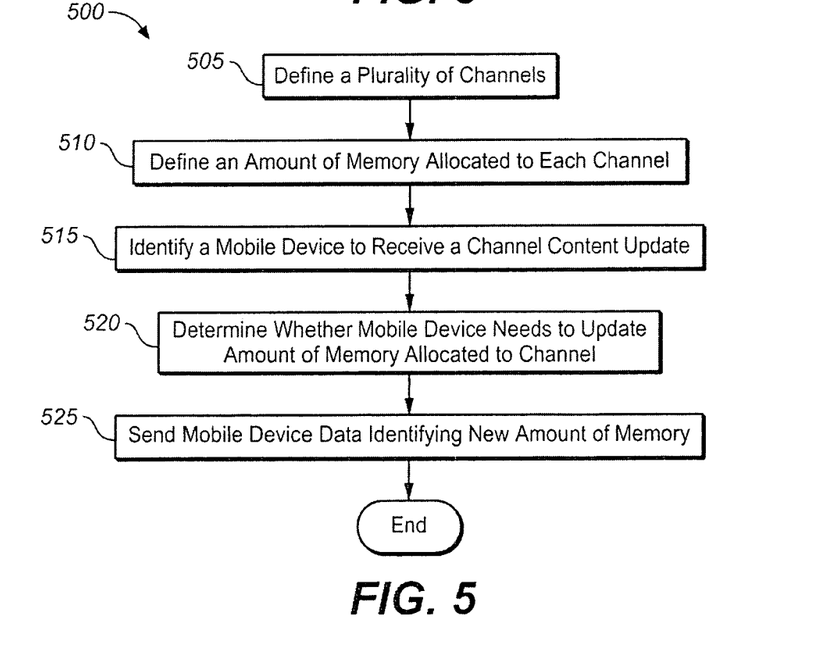
FIG. 5 is a flow chart illustrating an example method of updating memory allocation in accordance with some aspects of the present disclosure.

FIG. 5 is a flow chart illustrating an example process 500 of updating memory allocation in accordance with some aspects of the present disclosure. Generally, process 500 describes a process by which a mobile information system may adjust an allocation of memory in a mobile device. More specifically, method 500 describes a method by which a mobile information system may adjust the memory allocated to one or more channel feeds included in a feed store on a mobile device. For example, method 500 may be implemented in the system 100 of FIG. 1 to achieve some of the previously described functionality.

At 505, a plurality of channels are defined. At 510, an amount of memory allocated to each channel is defined. Next, at 515, a mobile device which will receive a channel content update is identified. The mobile device may be identified based on a predetermined schedule, in response to an automated request from the mobile device, in response to an availability of updates at the content provider, in response to an expiration or consumption (e.g., viewing) of content previously delivered to the mobile device or in some other way. At 520, a determination is made whether the mobile device needs to update the amount of memory allocated to the channel. This may be done using a variety of techniques. For example, an administrator may have a record of the channel memory requirement of the last update received by the mobile device, and the administrator may identify that the memory requirement of the current channel content update is greater than or less than that of the previous update. Alternatively, the server may not maintain information identifying a current memory allocation of the mobile device; instead, the amount of memory that should be allocated may be delivered to the mobile device, which may determine whether this amount differs from the amount currently allocated on the device. At 525, data identifying the new amount of memory is sent to the mobile device. The data may be sent, for example over wireless network 106. In some implementations, the data may be included as metadata in a channel content. Subsequently, memory requirements may be checked and/or the amount of memory allocated to the channel on the mobile device may be adjusted, as appropriate.

The preceding flowcharts and accompanying descriptions illustrate example methods. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, methods may be used with additional steps, fewer steps, and/or different steps, so long as the methods remain appropriate.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. The described techniques may be implemented in non-mobile environments (e.g., using wire-line communications, such as a cable connection, with a non-mobile client, such as a set-top box).

What is claimed is:

1. A method for allocating memory, the method comprising:
    defining a plurality of information channels on a mobile device, each information channel adapted to receive, from a remote server system, a predetermined category of content for access on the mobile device, the information channel content including information delivered to the mobile device through a wireless network and stored in a segment of a feed store of the mobile device corresponding to the information channel, wherein the information channel content is stored for subsequent retrieval in response to a user selection of the information channel on the mobile device and is adapted for display on a user interface of the mobile device using a virtual machine on the mobile device in response to the user selection;
    defining an amount of memory allocated to each information channel in the feed store for storing data relating to the information channel including the information channel content;

receiving allocation data identifying a new amount of memory allocated to one of the plurality of information channels in the feed store, the allocation data delivered to the mobile device through the wireless network from the remote server system;

adjusting the amount of memory allocated to the information channel in the feed store based on the allocation data identifying the new amount of memory;

receiving a content update for the information channel independent of the data identifying the new amount of memory; and storing the content update in the feed store in the memory allocated to the information channel.

2. The method of claim 1 wherein the content for each information channel is periodically updated from the remote server system.

3. The method of claim 2 further comprising:
receiving data identifying a new amount of memory allocated to another of the plurality of information channels;
identifying an unavailability of the new amount of memory on the mobile device; and
suspending updates to the information channel at least until the new amount of memory becomes available.

4. The method of claim 1, wherein the defined amount of memory allocated to each information channel is defined by data received from the remote server system.

5. The method of claim 1 wherein adjusting the amount of memory allocated to the information channel comprises:
determining that a current amount of stored data for the information channel exceeds the new amount of memory; and
delaying adjusting the amount of memory allocated to the information channel at least until the amount of stored data for the information channel does not exceed the new amount of memory.

6. The method of claim 1 wherein the new amount of memory is determined, at least in part, based on one or more characteristics of the device.

7. An article comprising a computer-readable medium storing instructions for causing data processing apparatus to perform operations comprising:
receiving content updates for a plurality of information channels on a mobile device, the content updates delivered to the mobile device from a remote server system through a wireless network;
storing the content updates in a data storage on the mobile device, wherein each information channel is allocated a particular amount of memory in a feed store of the data storage, the content updates are stored for subsequent retrieval in response to a user selection of the information channel on the mobile device, and each content update is adapted for display on a user interface of the mobile device in response to the user selection using a virtual machine on the mobile device;
receiving data identifying a new amount of memory to be allocated to a particular one of the information channels in the feed store, the data delivered to the mobile device through the wireless network from a remote server system;
adjusting the amount of memory allocated in the feed store to the particular information channel in response to the data identifying the new amount of memory;
receiving an additional content update for the particular information channel independent of receiving the data identifying the new amount of memory; and
storing the additional content update in the feed store using the memory allocated to the particular-information channel.

8. The article of claim 7 wherein the computer-readable medium stores instructions for causing data processing apparatus to further perform operations comprising presenting content corresponding to at least one content update for at least one information channel in response to a user selection on the mobile device.

9. The article of claim 8 wherein presenting the content comprises executing at least one file stored in the data storage using a media player on the mobile device.

10. The article of claim 7 wherein the content updates are received from the remote server system.

11. The article of claim 7 wherein the computer-readable medium stores instructions for causing data processing apparatus to further perform operations comprising requesting the content updates according to at least one predetermined update schedule.

12. The article of claim 7 wherein the computer-readable medium stores instructions for causing data processing apparatus to further perform operations comprising receiving the content updates based on a registration of the mobile device to receive content updates for the plurality of information channels, wherein a frequency of content updates is determined by a remote server.

13. A system comprising:
at least one database operable to store content for a plurality of available information channels, wherein the content comprises one or more files for delivery to remote devices based on a registration of each remote device to receive updates for one or more information channels;
one or more servers adapted to:
deliver content updates to remote devices based on the registration of each remote device to receive updates for one or more information channels, wherein the content updates are adapted for storage in a corresponding segment of a feed store on each remote device for subsequent retrieval and presentation on the remote device using a virtual machine on the remote device in response to a user selection on the remote device;
send instructions to the remote devices to adjust an amount of memory allocated to one or more information channels in the feed store based on the registration of each remote device to receive updates for the one or more information channels;
at least some of the content updates delivered to the remote devices for storage in the memory allocated to the one or more information channels independent of sending the instructions to adjust the amount of memory.

14. The system of claim 13, wherein each available information channel has an associated amount of memory in the feed store, further comprising an interface for receiving instructions to update the amount of memory associated with each available information channel.

15. The system of claim 13 wherein the one or more servers are further adapted to:
receive an error message from a remote device indicating an inability to adjust the amount of memory allocated to a particular information channel in the feed store on the remote device; and
suspend updates to the particular information channel for the remote device in response to the error message.

16. The system of claim 13 wherein the one or more servers are further adapted to:

receive content from one or more remote content providers; and update content, for at least one information channel, stored in the at least one database for delivery to remote devices based on the content received from the one or more remote content providers.

17. The system of claim 13 wherein the one or more servers are further adapted to deliver the content updates to each remote device based on at least one of a predetermined interval, an expiration of content previously delivered to the remote device, or a message from the remote device that content previously delivered to the remote device can be replaced.

18. The system of claim 13 wherein the one or more servers are further adapted to determine, for each remote device, whether the amount of memory allocated to one or more information channels needs to be updated on the remote device.

* * * * *